(12) United States Patent
Sieker et al.

(10) Patent No.: US 6,528,549 B2
(45) Date of Patent: Mar. 4, 2003

(54) RIGID POLYURETHANE FOAMS

(75) Inventors: Thomas Heinrich Sieker, Deggendorf (DE); Franco Gabrieli, Brebbia (IT); Saskia Rachel Walraedt, Zwijnaarde (BE)

(73) Assignee: Imperial Chemical Industries PLC, London (GB)

(*) Notice: Subject to any disclaimer, the term of this patent is extended or adjusted under 35 U.S.C. 154(b) by 0 days.

(21) Appl. No.: 10/090,783

(22) Filed: Mar. 6, 2002

(65) Prior Publication Data

US 2002/0123598 A1 Sep. 5, 2002

Related U.S. Application Data (62) Division of application No. 08/953,363, filed on Oct. 17, 1997, now Pat. No. 6,403,665.

(30) Foreign Application Priority Data

Nov. 4, 1996 (EP) .............................. 96117643

(51) Int. Cl.⁷ .............................................. C08G 18/14
(52) U.S. Cl. ...................... 521/121; 521/128; 521/130; 521/172
(58) Field of Search ................... 521/121, 128, 521/130, 172

(56) References Cited

U.S. PATENT DOCUMENTS

| | | | |
|---|---|---|---|
| 3,645,925 A | 2/1972 | Speranza et al. | |
| 3,661,808 A | 5/1972 | Kennedy | |
| 3,980,594 A | 9/1976 | Fabris et al. | |
| 4,228,248 A | 10/1980 | Zimmerman | |
| 4,758,605 A | 7/1988 | Williams | |
| 4,760,101 A | 7/1988 | Fechter et al. | |
| 4,972,002 A | 11/1990 | Volkert | |
| 4,981,879 A | 1/1991 | Snider | |
| 4,983,320 A | 1/1991 | Franklin et al. | |
| 5,034,424 A | 7/1991 | Wenning et al. | |
| 5,100,927 A | 3/1992 | Tamano et al. | |
| 5,430,071 A | 7/1995 | Green et al. | |
| 5,484,817 A | 1/1996 | Patterson | |
| 5,489,618 A | 2/1996 | Gerkin | |
| 5,527,876 A | 6/1996 | Kluth et al. | |
| 5,550,168 A | 8/1996 | Nakamura et al. | |
| 5,559,161 A | 9/1996 | Klotz et al. | |
| 5,561,171 A | 10/1996 | Demmin et al. | |
| 5,561,172 A | 10/1996 | Omure et al. | |
| 5,563,180 A | 10/1996 | Skowronski et al. | |
| 5,591,780 A | 1/1997 | Muha et al. | |
| 5,591,781 A | 1/1997 | Yoshimura et al. | |
| 5,840,779 A | * 11/1998 | Parker et al. ............... 521/115 |

FOREIGN PATENT DOCUMENTS

| | | |
|---|---|---|
| DE | 44 44 249 | 6/1996 |
| EP | 498 628 | 8/1992 |
| EP | 508 649 | 10/1992 |
| GB | 839185 | 6/1960 |
| GB | 879 167 | 10/1961 |
| GB | 1 534 236 | 11/1978 |
| JP | 3/160015 | 7/1991 |
| WO | 95/18176 | 7/1995 |

OTHER PUBLICATIONS

D.W. Dedeaux et al., "TEXACAT Catalysts in Water Blown Rigid Foam," 34 PU Conference; Oct. 1992, p. 341.

* cited by examiner

*Primary Examiner*—John M. Cooney, Jr.
(74) *Attorney, Agent, or Firm*—Pillsbury Winthrop LLP (57) ABSTRACT

Polyol blend comprising a polyester polyol, a tertiary amine catalyst and an organic carboxylic acid wherein said carboxylic acid contains at least one OH, SH, $NH_2$ or NHR functional group, wherein R is an alkyl, cycloalkyl or aryl group and the use of said polyol blend in the manufacture of rigid polyurethane foams.

20 Claims, 4 Drawing Sheets

RIGID POLYURETHANE FOAMS

This application is a divisional application of U.S. patent application Ser. No. 08/953,363, filed on Oct. 17, 1997 which is now U.S. Pat. No. 6, 403, 665. The contents of the parent application are hereby incorporated in their entirety by reference.

This invention relates to rigid polyurethane or urethane-modified polyisocyanurate foams, to processes for their preparation and to polyol blends for use in said processes.

Rigid polyurethane and urethane-modified polyisocyanurate foams are in general prepared by reacting a stoichiometric excess of polyisocyanate with isocyanate-reactive compounds in the presence of blowing agents, surfactants and catalysts. One use of such foams is as a thermal insulation medium in, for example, buildings. Polyether polyols or polyester polyols are generally used as isocyanate-reactive compounds.

Polyester polyols impart excellent flame retardancy characteristics to the resulting polyurethane foams and are in some cases even less expensive than polyether polyols.

There is a problem in respect of the stability of polyol blends containing polyester polyols and tertiary amine catalysts. It has been proposed to solve this problem by adding an organic carboxylic acid (such as formic acid, acetic acid, 2-ethylhexanoic acid) to the polyol blend (see U.S. Pat. No. 4, 758, 605). In order to retain the reactivity over prolonged storage catalyst levels need to be increased. Whereas the instability problem can be solved successfully in this way the processing of these systems is still uncontrollable which is reflected in the rise profile of the rising foam when the polyol blend is reacted with the polyisocyanate composition.

BRIEF SUMMARY OF THE INVENTION

Therefore it is an object of the present invention to provide polyol blends containing polyester polyols and tertiary amine catalysts not showing the disadvantages mentioned above.

DETAILED DESCRIPTION OF THE INVENTION

According to the present invention polyol blends are provided comprising a polyester Polyol, a tertiary amine catalyst and an organic carboxylic acid wherein said carboxylic acid contains at least one OH, SH, $NH_2$ or NHR functional group, wherein R is an alkyl, cycloalkyl or aryl group.

The polyol blends of the present invention are stable for several weeks. Improved reaction profiles are obtained when these polyol blends are used to make rigid polyurethane foams; the cream time is decreased while at the same time the expansion of the foam at string time is almost complete. Carboxylic acids to be used in the present invention have the general formula $X_n$—R'—(CCOH), wherein X is OH, SH, $NH_2$ or NHR, R' is an at least divalent hydrocarbon moiety, typically an at least divalent linear or branched aliphatic hydrocarbon moiety and/or an at least divalent alicyclic or aromatic hydrocarbon moiety, n is an integer having a value of at least 1 and allows for mono and polyfunctional substitution on the hydrocarbon moiety, m is an integer having a value of at least 1 and allows for mono and polycarboxyl substitution on the hydrocarbon moiety. The "at least divalent hydrocarbon moiety" can be a saturated or unsaturated moiety of 1 to 20 carbon atoms, including a linear aliphatic moiety, a branched aliphatic moiety, an alicyclic moiety or an aromatic moiety. Stated otherwise, R' can, for example, be a linear or branched alkylene group of 1 to 10 carbon atoms, a cyclic alkylene group of 4 to 10 carbon atoms, or an arylene, an alkarylene or an ararylene group of 6 to 20 carbon atoms. Specific non-limiting examples of suitable hydrocarbon moieties are methylene, ethylene, n-propylene, isopropylene, n-butylene, isobutylene, n-amylene, n-decylene, 2-ethylhexylene, o-, m-, p-phenylene, ethyl-p-phenylene, 2, 5-naphthylene, p, p'-biphenylene, cyclopentylene, cycloheptylene, xylylene, 1, 4-dimethylenephenylene and the like. While above-noted radicals have two available substitution sites, at least one for a carboxyl group and one for a OH, SH, $NH_2$ or NHR group, it is contemplated that additional hydrogens on the hydrocarbon could be replaced with further carboxyl and/or OH, SH, $NH_2$ or NHR groups.

The carboxylic acids useful in the practice of the present invention generally have molecular weights below about 250.

The following carboxylic acids are illustrative of compounds suitable for practicing the present invention: citric acid, dimethylolpropionic acid, bis-(hydroxymethyl) propionic acid, bishydroxypropionic acid, salicylic acid, m-hydroxy benzoic acid, p-hydroxy benzoic acid, dihydroxybenzoic acid, glycolic acid, β-hydroxybutyric acid, cresotic acid, 3-hydroxy-2-naphthoic acid, lactic acid, tartaric acid, malic acid, resorcylic acid, hydroferulic acid, glycine, alanine, mercaptoacetic acid and the like.

Preferably X is OH, n is 1, R' is a linear or branched aliphatic hydrocarbon having 1 to 5 carbon atoms and m is 1, 2 or 3. Polycarboxylic acids are preferred. The hydroxyl group is preferably in α or β position with respect to the carboxyl group.

Most preferred carboxylic acids are lactic acid, glycolic acid, malic acid and citric acid.

At least one of said carboxylic acids is used; mixtures of two or more of these acids can be used as well.

Particularly preferred carboxylic acids for use in the present invention are malic acid or a combination of malic acid and citric acid, preferably in a weight ratio of between 75:25 and 25:75, most preferably in a weight ratio of about 1:1. Further improvements in reaction profile are observed. The combination of malic acid and citric acid also leads to improvements in other physical properties of the obtained foam such as compression strength and adhesion; also less variation in density distribution.

The carboxylic acid is generally used in an amount ranging from 0.1 to 5% by weight based on the isocyanate-reactive composition, preferably about 1% to 3%.

The term "polyester polyol" as used herein is meant to include any polyester polyol having a hydroxyl functionality of at least two wherein the majority of the recurring units contain ester linkages and the molecular weight is at least 400.

The polyester polyols for use in the present invention advantageously have an average functionality of about 1.8 to 8, preferably about 2 to 6 and more preferably about 2 to 2.5. Their hydroxyl number values generally fall within a range of about 15 to 750, preferably about 30 to 550, more preferably 70 to 550 and most preferably about 200 to 550 mg KOH/g. The molecular weight of the polyester polyol generally falls within the range of about 400 to about 10000, preferably about 1000 to about 6000. Preferably the polyester polyols have an acid number between 0.1 and 20 mg KOH/g; in general the acid number can be as high as 90 mg KOH/g.

The polyester polyols of the present invention can be prepared by known procedures from a polycarboxylic acid or acid derivative, such as an anhydride or ester of the polycarboxylic acid, and any polyhydric alcohol. The polyacid and/or polyol components may be used as mixtures of two or more compound in the preparation, of the polyester polyols.

The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. A preferred polyol component is a glycol. The glycols may contain heteroatoms (e.g., thiodiglycol) or may be composed solely of carbon, hydrogen and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. Examples of suitable polyhydric alcohols include: ethylene glycol, propylene glycol -(1,2) and -(1,3, butylene glycol -(1,4) and -(2,3), hexanediol -(1,6), octanediol -(1,8), neopentyl glycol, 1,4-bishydroxymethyl cyclohexane, 2-methyl-1,3-propane diol, glycerin, trimethylolethane, hexanetriol -(1,2,6), butanetriol -(1,2,4), quinol, methyl glucoside, triethyleneglycol, tetraethylene glycol and higher polyethylene glycols, dipropylene glycol and higher polypropylene glycols, diethylene glycol, glycerol, pentaerythritol, trimethylolpropane, sorbitol, mannitol, dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol, tetramethylene glycol and 1,4-cyclohexanedimethanol (1,4-bis-hydroxymethylcyclohexane).

The polycarboxylic acid component may be aliphatic, cycloaliphatic, aromatic and/or heterocyclic and may optionally be substituted, for example, by halogen atoms and/or may be unsaturated. Examples of suitable carboxylic acids and derivatives thereof for the preparation of the polyester polyols include: oxalic acid, malonic acid, adipic acid, glutaric acid, succinic acid, pimelic acid, suberic acid, azelaic acid, sebacic acid, phthalic acid, phthalic acid anhydride, terephthalic anhydride, isophthalic acid, terephthalic acid, trimellitic acid, tetrahydrophthalic acid anhydride, pyromelltic dianhyfride, hexahydrophthalic acid anhydride, tetrachlorophthalic acid anhydride, endomethylene tetrahydrophthalic anhydride, glutaric acid anhydride, maleic acid, maleic acid anhydride, terephthalic acid dimethylester, terephthalic acid-bis glycol ester, fumaric acid, dibasic and tribasic unsaturated fatty acids optionally mixed with monobasic unsaturated fatty acids, such as oleic acids.

While the polyester polyols can be prepared from substantially pure reactant materials, more complex ingredients can be used, such as the side-stream, waste or scrap residues from the manufacture of phthalic acid, terephthalic acid, dimethyl terephthalate, polyethylene terephthalate, and the like. These compositions can be converted by reaction with polyols to polyester polyols through conventional transesterification or esterification procedures.

The production of the polyester polyols is accomplished by simply reacting the polycarboxylic acid or acid derivative with the polyol component in a known manner until the hydroxyl and acid values of the reaction mixture fall in the desired range. After transesterification or esterification the reaction product can optionally be reacted with an alkylene oxide.

The term "polyester polyol" as used herein includes any minor amounts of unreacted polyol remaining after the preparation of the polyester polyol and/or unesterified polyol (e.g., glycol) added after the preparation. The polyester polyol can advantageously include up to about 40% by weight free glycol. Preferably the free glycol content is from 2 to 30, more preferably from 2 to 15% by weight of the total polyester polyol component.

Aliphatic and/or aromatic polyester polyols can be used according to the present invention.

Mixtures of two or more different polyester polyols can be used.

According to the present invention the polyester polyols described above can constitute the totality of the reactive mixture reacted with the polyisocyanate; it is understood, however, that these polyols could also be used mixed with other isocyanate-reactive compounds conventionally used in the art; preferably at least 10%, more preferably at least 20% by weight of the total isocyanate-reactive compounds are polyester polyols as described above.

The isocyanate-reactive compounds which can be employed in combination with the polyester polyols in the preparation of the rigid polyurethane foams of the present invention include any of those known in the art for that purpose. Of particular importance for the preparation of rigid foams are polyols and polyol mixtures having average hydroxyl numbers of from 300 to 1000, especially from 300 to 700 mg KOH/g,and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolyene diamine, diaminodiphenylmethane and polymethylene polyphenylene polyamines; and aminoalcohols, for example ethanolamine and diethanolamine; and mixtures of such initiators. Further suitable polymeric polyols include hydroxyl terminated polythioethers, polyamides, polyesteramides, polycarbonates, polyacetals, polyolefins and polysloxanes.

Any organic compound containing at least one nitrogen atom, preferably a tertiary nitrogen atom and which is capable of catalysing the hydroxyl/isocyanate reaction can be used in the blends of the present invention.

Typical classes of tertiary amine catalysts include the N-alkylmorpholines, N-alkayalkanolamines, N,N-dialkylcyclohexylamines and alkylamines where the alkyl groups are methyl, ethyl, propyl, butyl and the like and isomeric forms thereof; and heterocyclic amines. Typical but not limiting thereof are triethylenediamine, tetramethylethylenediamine, bis (2-dimethylaminoethyl; ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, 2,4,6-tri(dimethylaminomethyl) phenol, N,N',N"-tris(dimethylaminopropyl)-sym-hexahydrotriazine, and the like, and mixtures thereof. Also amines containing isocyanate-reactive groups such as aminoalcohols can be used; examples hereof include 2-(2-dimethylaminoethoxy)ethanol, trimethylaminoethylethanolamine and dimethylethylethanolamine.

Preferred tertiary amine catalysts include triazines, dimethylbenzylamine, bis(dimethylaminoethyl)ether and dimethylcyclohexylamine. Especially dimorpholino diethylether, N-methylimidazole and dimethylamino pyridine are preferred; they further improve the reaction profile.

The tertiary amine catalyst is generally present in proportions of from about 0.01 to about 10 pbw per 100 pbw of polyol. Preferably the amount of amine is from about 0.1 to about 5 pbw, most preferably from about 0.2 to about 3 pbw per 100 pbw of polyol.

The blend of the present invention can also contain any of the blowing agents known in the art for the preparation of rigid polyurethane or urethane-modified polyisocyanurate foams. Such blowing agents include water or other carbon dioxide-evolving compounds, or inert low boiling compounds having a boiling point of above −70° C. at atmospheric pressure.

Where water is used as blowing agent, the amount may be selected in known manner to provide foams of the desired density, typical amounts being in the range from 0.05 to 5% by weight based on the total reaction system.

Suitable Inert blowing agents include those well known and described in the art, for example, hydrocarbons, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers.

Examples of preferred blowing agents include isobutane, n-pentane, isopentane, cyclopentane or mixtures thereof, 1,1-dichloro-2-fluoroethane (HCFC 141b), 1,1,1-trifluoro-2-fluoroethane (HFC 134a), chlorodifluoromethane (HCFC 22), 1,1-difluoro-3,3,3-trifluoropropane (HFC 245fa) and blends thereof.

Particular mention may be made of blowing agent mixtures as described in PCT Patent Publication No. 96/12758, incorporated herein by reference, for manufacturing low density, dimensionally stable rigid foam. These blowing agent mixtures generally comprise at least 3 and preferably at least 4 components of which preferably at least one is a (cyclo)alkane (preferably of 5 or 6 carbon atoms) and/or acetone.

The blowing agents are employed in an amount sufficient to give the resultant foam the desired bulk density which is generally in the range 15 to 70 kg/m$^3$, preferably 20 to 50 kg/m$^3$, most preferably 25 to 40 kg/m$^3$. Typical amounts of blowing agents are in the range 2 to 25% by weight based on the total reaction system.

When a blowing agent has a boiling point at or below ambient it is maintained under pressure until mixed with the other components. Alternatively, it can be maintained at subambient temperatures until mixed with the other components.

Other optional additives for the polyol blends of the present invention include crosslinking agents, for examples low molecular weight polyols such as triethanolamine, processing aids, viscosity reducers, dispersing agents, plasticizers, mold release agents, antioxidants, fillers (e.g. carbon black), cell size regulators such as insoluble fluorinated compounds (as described, for example, in U.S. Pat. No. 4,981,879, U.S. Pat. No. 5,034,424, U.S. Pat. No. 4,972,002, EP 0508649, EP 0498628, WO 95/18176), non-amine polyurethane catalysts (e.g. stannous salts of carboxylic acids), trimerisation catalysts (e.g. alkali metal carboxylic acid salts), surfactants such as polydimethylsiloxane-polyoxyalkylene block copolymers and non-reactive and reactive fire retardants, for example halogenated alkyl phosphates such as tris chloropropyl phosphate, triethylphosphate, diethylethylphosphonate and dimethylmethylphosphonate. The use of such additives is well known to those skilled in the art.

Suitable organic polyisocyanates to be reacted with the polyol blends of the present invention to form rigid polyurethane or urethane-modified polyisocyanurate foams include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane. Further suitable polyisocyanates for use in the process of the present invention are those described in EP-A-0320134.

Modified polyisocyanates, such as carbodiimide or uretonimine modified polyisocyanates can also be employed.

Still other useful organic polyisocyanates are isocyanate-terminated prepolymers prepared by reacting excess organic polyisocyanate with a minor amount of an active hydrogen-containing compound.

Preferred polyisocyanates to be used in the present invention are the polymeric MDI's.

The quantities of the polyisocyanate composition and the polyfunctional isocyanate-reactive composition to be reacted can be readily determined by the man skilled in the art. In general the NCO:OH ratio falls within the range 0.85 to 1.40, preferably about 0.95 to 1.20. Also higher NCO:OH ratios (for example, up to 3.0) fall within the present invention.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

According to one embodiment of the present invention the polyol blend as describes above is reacted with a polyisocyanate composition to make rigid polyurethane foams.

According to another embodiment of the present invention the ingredients (polyester polyol, amine catalyst and carboxylic acid) are not added as a blend but are added separately to the reaction mixture.

The foams of the present invention are advantageously used for producing laminates whereby the foam is provided on one or both sides with a facing sheet. The laminates can be made in a continuous or discontinuous manner by depositing the foam-forming mixture on a facing sheet and preferably placing another facing sheet on the deposited mixture. Any facing sheet previously employed to produce building panels can be employed and can be of a rigid or flexible nature.

The various aspects of this invention are illustrated, but not limited by the following examples in which the following ingredients are used:

Polyol A: a sorbitol initated polyether polyol of OH value 460 mg KOH/g.

Polyol B: an aliphatic polyester polyol of OH value 356 mg KOH/g and acid value 0.5 mg KOH/g.

Polyol C: an aromatic amine initiated polyether polyol of OH value 495 mg KOH/g.

Polyol D: a brominated polyether polyol of OH value 310 mg KOH/g.

Polyol E: an aromatic polyester polyol of OH value 240 mg KOH/g.

Polyol F: an aromatic polyester polyol of OH value 350 mg KOH/g.

Fire retardant A: a chlorinated flame retardant.

Fire retardant B: a phosphorous based flame retardant.

Surfactant: a silicone surfactant.

DMBA: dimethylbenzylamine catalyst available from Protex.

DMDEE: dimorpholinodiethylether catalyst available from Nitroil.

DMAP: dimethylaminopyridine catalyst available from Aldrich.

NMI: N-methyl imidazole catalyst available from BASF.

Polycat 41: tris(dimethylaminopropyl)hexahydrotriazine catalyst available from Air Products.

Niax A1: bis(dimethylaminoethyl)ether catalyst available from OSi.

Texacat DP914: a catalyst available from Texaco.

DMCHA: dimethylcyclohexylamine catalyst available from BASF.

SUPRASEC DNR: polymeric MDI available from Imperial Chemical Industries.

SUPRASEC is a trademark of Imperial Chemical Industries.

EXAMPLE 1

Rigid polyurethane foams were made from a polyol composition and a polyisocyanate composition containing the ingredients listed below in Table 1 at an NCO index of 1.15.

The reaction profile was followed in respect of cream time (time taken for the reaction mixture to start foaming) and string time (time taken for the reaction mixture to reach the transition point from fluid to cross-linked mass). The height of expansion was measured at the string time and also at the end of rise of the foam; from those two figures the expansion factor at string time (height at string/height at end of rise) was determined.

The results are also given in Table 1.

Figure 1:
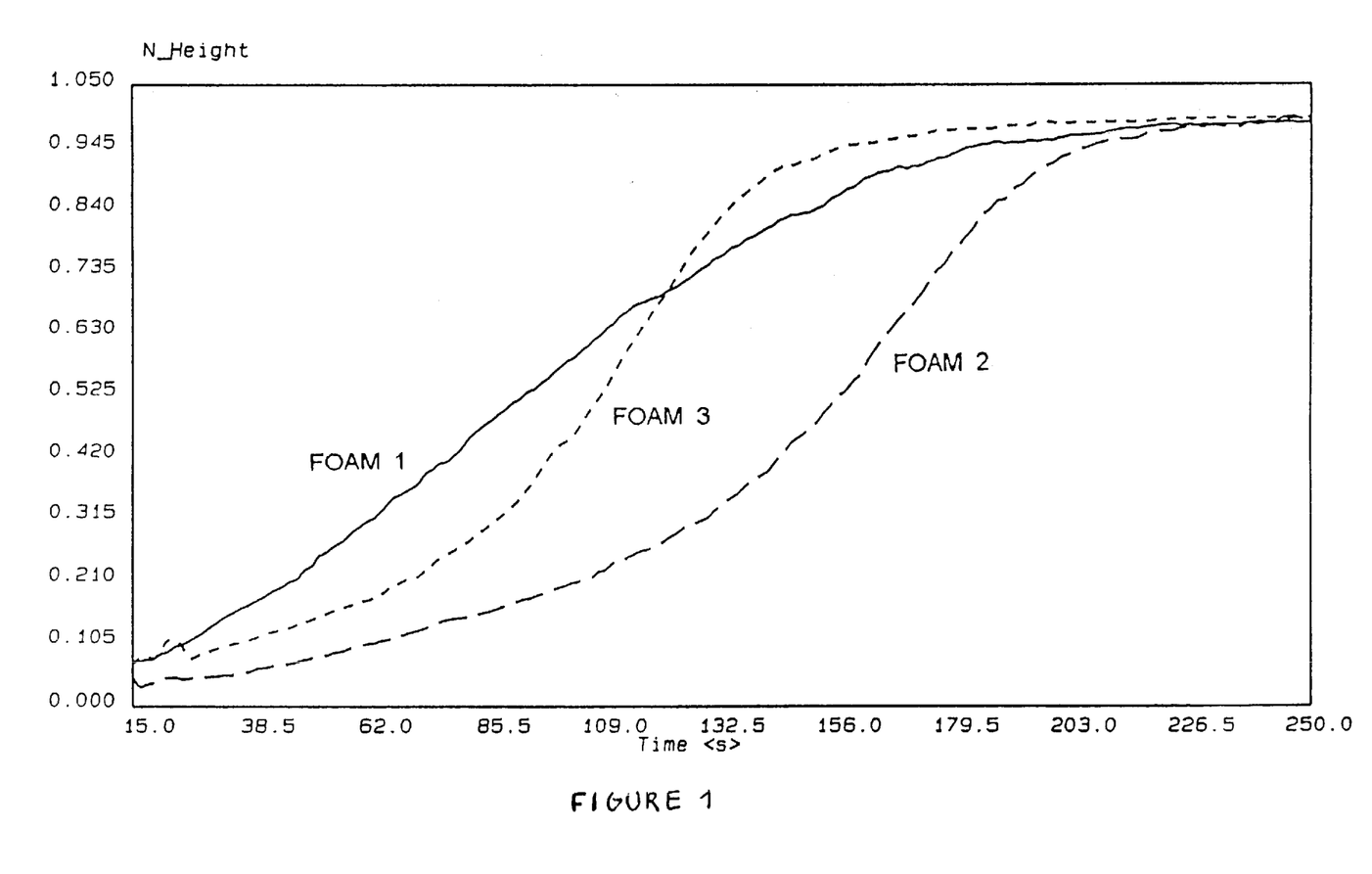
FIG. 1 shows the rise profiles of foams 1, 2, and 3 over time.

The rise profile was also followed by Dynamic Flow Data analysis. Results are presented in FIGS. 1, 2 and 3 expressing the height of the rising foam versus the reaction time.

Figure 2:
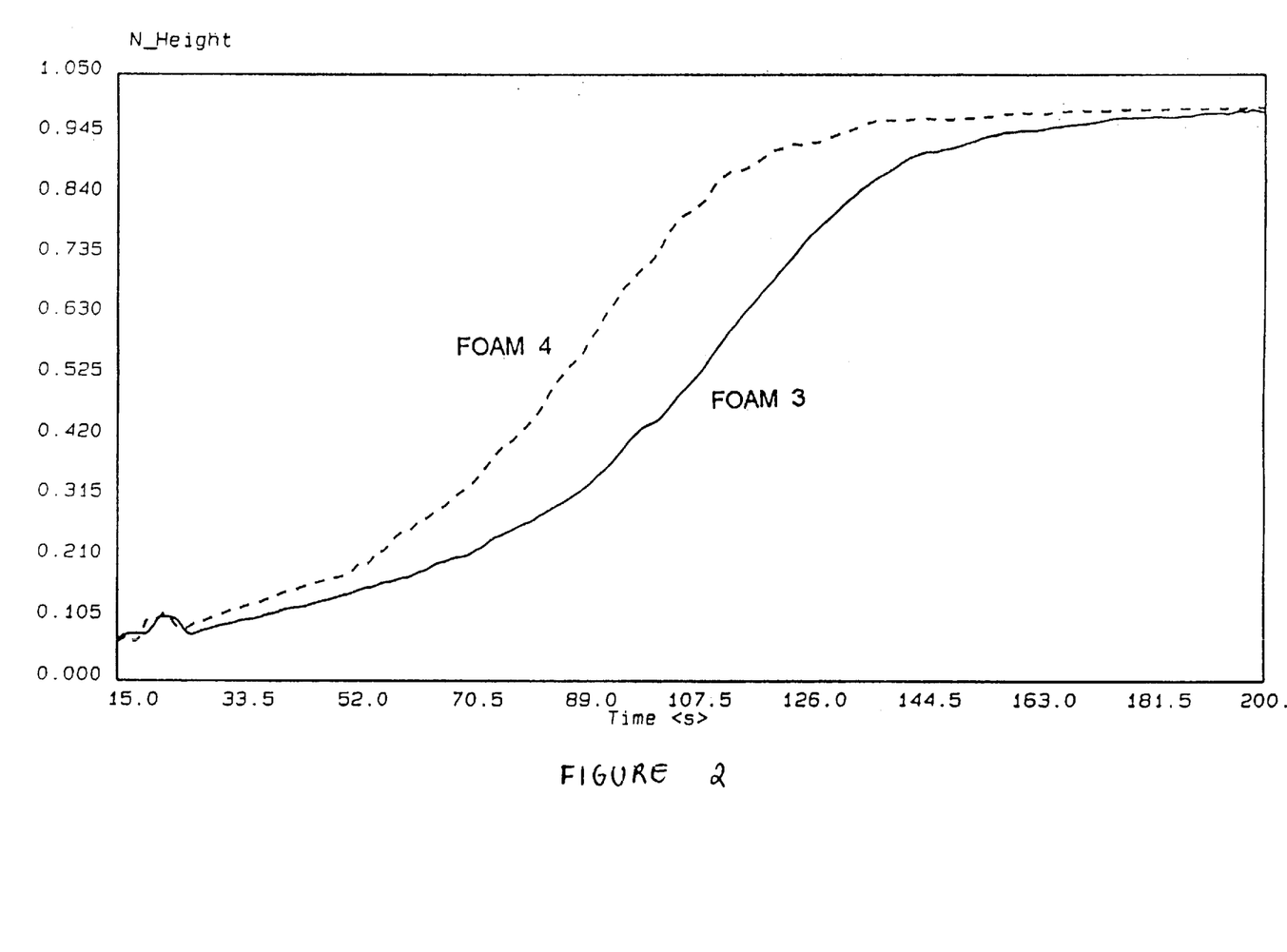
FIG. 2 shows the rise profiles of foams 3 and 4 over time.

These results show that whereas acetic acid leads to delayed action catalysis (Foam No. 2) addition of functionalised carboxylic acids of the present invention improves the reaction profile (Foam No. 3) (see FIG. 1) Addition of selected classes of catalysts (for example, DMDEE, DMAP, NMI, Texacat DP914) (Foams No. 4, 5, 6, 7, 9) further improves the reaction profile (see FIG. 2).

Figure 3:
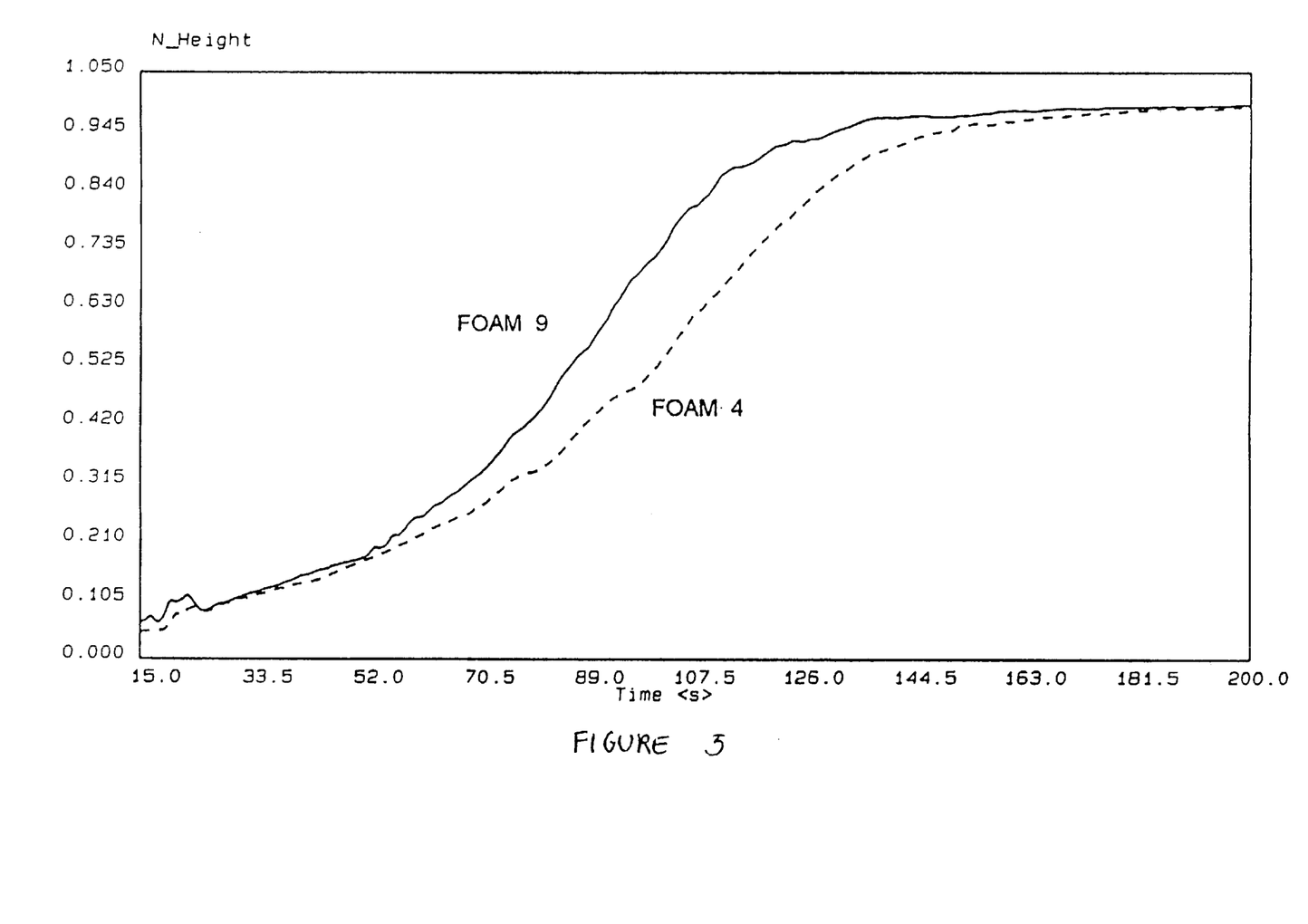
FIG. 3 shows the rise profiles of foams 4 and 9 over time.

Glycolic acid (Foam No. 9) performs better than lactic acid (Foam No. 4) in terms of reaction profile improvement (see FIG. 3).

TABLE 1

| Foam No. | | 1 | 2 | 3 | 4 | 5 | 6 | 7 | 8 | 9 |
|---|---|---|---|---|---|---|---|---|---|---|
| POLYOL | | | | | | | | | | |
| Polyol A | pbw | 20.5 | 20.5 | 20.5 | 20.5 | 20.5 | 20.5 | 20.5 | 20.5 | 20.5 |
| Polyol B | pbw | 23.0 | 23.0 | 23.0 | 23.0 | 23.0 | 23.0 | 23.0 | 23.0 | 23.0 |
| Polyol C | pbw | 10.0 | 10.0 | 10.0 | 10.0 | 10.0 | 10.0 | 10.0 | 10.0 | 10.0 |
| Polyol D | pbw | 21.0 | 21.0 | 21.0 | 21.0 | 21.0 | 21.0 | 21.0 | 21.0 | 21.0 |
| acetic acid | pbw | | 1.0 | | | | | | | |
| glycolic acid | pbw | | | | | | | | | 1.0 |
| lactic acid | pbw | | | 1.1 | 1.1 | 1.1 | 1.1 | 1.1 | 1.1 | |
| Fire retardant A | pbw | 8.3 | 8.3 | 8.3 | 8.3 | 8.3 | 8.3 | 8.3 | 8.3 | 8.3 |
| Fire retardant B | pbw | 8.3 | 8.3 | 8.3 | 8.3 | 8.3 | 8.3 | 8.3 | 8.3 | 8.3 |
| Surfactant | pbw | 2.0 | 2.0 | 2.0 | 2.0 | 2.0 | 2.0 | 2.0 | 2.0 | 2.0 |
| DMBA | pbw | 1.0 | 1.0 | 1.0 | 1.0 | 1.0 | 1.0 | 1.0 | 1.0 | 1.0 |
| DMDEE | pbw | | | | | 1.5 | | | | 1.5 |
| DMAP | pbw | | | | | | | | 0.3 | |
| NMI | pbw | | | | | | 0.3 | | | |
| Polycat 41 | pbw | | | | | | | | 0.7 | |
| Niax A1 | pbw | 0.15 | | | | | | | | |
| Texacat DP914 | pbw | | | | | | | 0.5 | | |
| DMCHA | pbw | 0.80 | 0.80 | 0.80 | | | | | | |
| water | pbw | 3.3 | 3.3 | 3.3 | 3.3 | 3.3 | 3.3 | 3.3 | 3.3 | 3.3 |
| HCFC 141b | pbw | 4.2 | 4.2 | 4.2 | 4.2 | 4.2 | 4.2 | 4.2 | 4.2 | 4.2 |
| POLYISOCYANATE | | | | | | | | | | |
| SUPRASEC DNR | pbw | 139 | 139 | 139 | 139 | 139 | 139 | 139 | 139 | 139 |
| Cream time | sec | 17 | 18 | 16 | 17 | 20 | 16 | 17 | 18 | 13 |
| String time | sec | 154 | 162 | 128 | 120 | 134 | 131 | 141 | 137 | 127 |
| Expansion factor at string time | % | 93 | 56 | 79 | 89 | 90 | 86 | 90 | 84 | 95 |

EXAMPLE 2

The stability of the polyol blend of Foam No. 1 and Foam No. 3 (as identified above in Table 1) was determined by measuring cream time, string time and density of the foam prepared initially and after storage of the polyol blend for 3 days, 1 week and 3 weeks, respectively, at 40° C.

The results are presented in Table 2 for Foam No. 1 and in Table 3 for Foam No. 3.

TABLE 2

| Foam No. 1 | Cream time (sec) | String time (sec) | Density (g/l) |
|---|---|---|---|
| Initial | 17 | 154 | 27.6 |
| After 3 days | 18 | 185 | 28.0 |
| After 1 week | 20 | 245 | 29.0 |
| After 3 weeks | 24 | 267 | 29.6 |

TABLE 3

| Foam No. 3 | Cream time (sec) | String time (sec) | Density (g/l) |
|---|---|---|---|
| Initial | 23 | 152 | 27.8 |
| After 3 days | 24 | 155 | 28.2 |
| After 1 week | 23 | 160 | 28.3 |
| After 3 weeks | 24 | 161 | 28.1 |

These rests show that whereas there are relatively large variations in cream time, string time and density for Foam No. 1, these differences are only marginal for Foam No. 3. Thus stability of the polyol blends containing the functionalised carboxylic acids of the present invention is improved compared to polyol blends not containing said acids.

EXAMPLE 3

Rigid polyurethane foams were made from a polyol composition and a polyisocyanate composition containing the ingredients listed below in Table 4 at an NCO index of 1.15.

The reaction profile was followed in respect of cream time (time taken for the reaction mixture to start foaming) and string time (time taken for the reaction mixture to reach the transition point from fluid to cross-linked mass). The height of expansion was measured at the string time and also at the end of rise of the foam; from those two figures the expansion factor at string time (height at string/height at end of rise) was determined.

The results are also given in Table 4.

It is to be noted that using citric acid or malic acid leads to the lowest density foam.

EXAMPLE 4

Rigid polyurethane foams were made from a polyol composition and a polyisocyanate composition containing the ingredients listed below in Table 5 at an NCO index of 1.15.

The reaction profile was followed in respect of cream time (time taken for the reaction mixture to start foaming) and string time (time taken for the reaction mixture to reach the transition point from fluid to cross-linked mass). The height of expansion was measured at the string time and also at the end of rise of the foam; from those two figures the expansion factor at string time (height at string/height at end of rise) was determined.

The results are also given in Table 5.

The rise profile as also followed by Dynamic Flow Data analysis. Results are presented in FIG. 4 expressing the height of the rising foam versus the reaction time for Foams Nos 18, 19 and 20.

Figure 4:
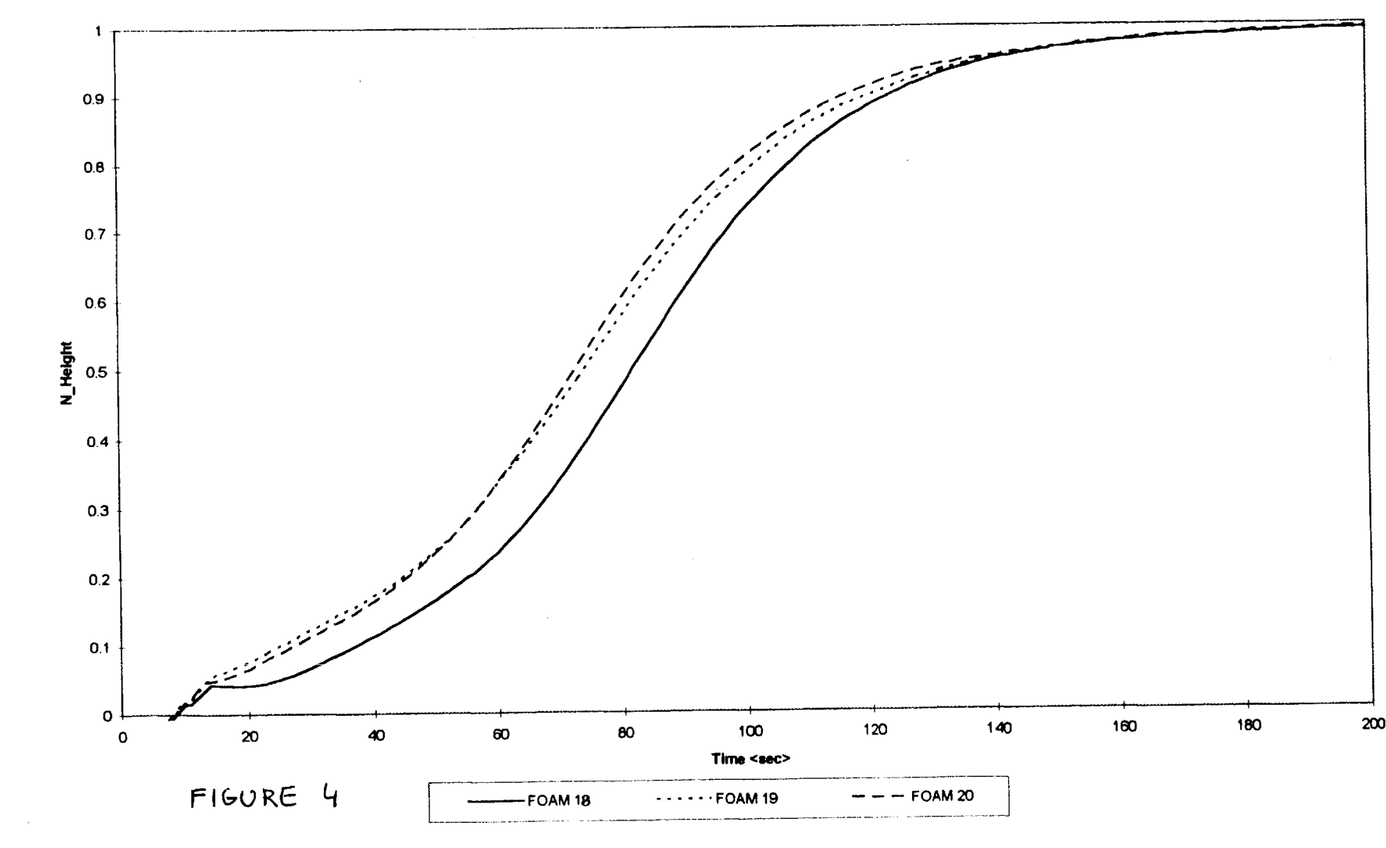
FIG. 4 shows the rise profiles of foams 18, 19, and 20 over time.

These results show that further improvements in reaction profile are obtained when malic acid (Foam No. 19) or a combination of malic acid and citric acid (Foam No. 20) are used instead of lactic acid (Foam No. 18).

TABLE 4

| Foam No. | | 10 | 11 | 12 | 13 | 14 | 15 | 16 | 17 |
|---|---|---|---|---|---|---|---|---|---|
| POLYOL | | | | | | | | | |
| Polyol A | pbw | 20.5 | 20.5 | 20.5 | 20.5 | 20.5 | 20.5 | 20.5 | 20.5 |
| Polyol B | pbw | 23.0 | 23.0 | 23.0 | 23.0 | 23.0 | 23.0 | 23.0 | 23.0 |
| Polyol C | pbw | 10.0 | 10.0 | 10.0 | 10.0 | 10.0 | 10.0 | 10.0 | 10.0 |
| Polyol D | pbw | 21.0 | 21.0 | 21.0 | 21.0 | 21.0 | 21.0 | 21.0 | 21.0 |
| Lactic acid | pbw | 1.1 | | | | | | | |
| Tartaric acid | pbw | | 1.1 | | | | | | |
| 4-Hydroxybenzoic acid | pbw | | | 1.1 | | | | | |
| Citric acid | pbw | | | | 1.1 | | | | |
| Salicylic acid | pbw | | | | | 1.1 | | | |
| Malic acid | pbw | | | | | | 1.1 | | |
| Glycolic acid | pbw | | | | | | | 1.1 | |
| Bis(hydroxymethyl)propionic acid | pbw | | | | | | | | 1.1 |
| Fire retardant A | pbw | 8.3 | 8.3 | 8.3 | 8.3 | 8.3 | 8.3 | 8.3 | 8.3 |
| Fire retardant B | pbw | 8.3 | 8.3 | 8.3 | 8.3 | 8.3 | 8.3 | 8.3 | 8.3 |
| Surfactant | pbw | 2.0 | 2.0 | 2.0 | 2.0 | 2.0 | 2.0 | 2.0 | 2.0 |
| DMBA | pbw | 1.0 | 1.1 | 0.5 | 1.0 | 1.25 | 0.6 | 0.8 | 0.5 |
| DMDEE | pbw | 1.5 | 1.5 | 1.5 | 1.5 | 1.5 | 1.5 | 1.5 | 1.5 |
| water | pbw | 3.3 | 3.3 | 3.3 | 3.3 | 3.3 | 3.3 | 3.3 | 3.3 |
| HCFC 141b | pbw | 4.2 | 4.2 | 4.2 | 4.2 | 4.2 | 4.2 | 4.2 | 4.2 |
| POLYISOCYANATE | | | | | | | | | |
| SUPRASEC DNR | pbw | 139 | 139 | 139 | 139 | 139 | 139 | 139 | 139 |
| Density | kg/m$^3$ | 30.9 | 32.6 | 33.1 | 30.5 | 32.1 | 30.8 | 31.8 | 32.5 |
| Cream time | sec | 20 | 16 | 19 | 20 | 23 | 17 | 34 | 21 |
| String time | sec | 110 | 113 | 107 | 103 | 107 | 110 | 125 | 110 |
| Expansion factor at string time | % | 92 | 88 | 92 | 92 | 92 | 92 | 84 | 89 |

TABLE 5

| Foam No. | | 18 | 19 | 20 | 21 | 22 |
|---|---|---|---|---|---|---|
| POLYOL | | | | | | |
| Polyol A | pbw | 20.5 | 20.5 | 20.5 | 20.5 | 20.5 |
| Polyol B | pbw | 23.0 | 23.0 | 23.0 | 23.0 | 23.0 |
| Polyol C | pbw | 10.0 | 10.0 | 10.0 | 10.0 | 10.0 |
| Polyol D | pbw | 21.0 | 21.0 | 21.0 | 21.0 | 21.0 |
| Lactic acid | pbw | 1.1 | | | | |
| Malic acid | pbw | | 1.0 | 0.5 | 0.25 | 0.75 |
| Citric acid | pbw | | | 0.5 | 0.75 | 0.25 |
| Fire retardant A | pbw | 8.3 | 8.3 | 8.3 | 8.3 | 8.3 |
| Fire retardant B | pbw | 8.3 | 8.3 | 8.3 | 8.3 | 8.3 |
| Surfactant | pbw | 2.0 | 2.0 | 2.0 | 2.0 | 2.0 |
| DMBA | pbw | 1.0 | 0.6 | 0.7 | 0.66 | 0.79 |
| DMDEE | pbw | 1.5 | 1.5 | 1.5 | 1.5 | 1.5 |
| water | pbw | 3.3 | 3.3 | 3.3 | 3.3 | 3.3 |
| HCFC 141b | pbw | 4.2 | 4.2 | 4.2 | 4.2 | 4.2 |
| POLYISOCYANATE | | | | | | |
| SUPRASEC DNR | pbw | 139 | 139 | 139 | 139 | 139 |
| Cream time | sec | 20 | 13 | 13 | 17 | 13 |
| String time | sec | 108 | 108 | 104 | 102 | 104 |
| Expansion factor at string time | % | 91.4 | 90.1 | 92.4 | 92.2 | 91.7 |

EXAMPLE 5

The stability of the polyol blend of Foam No. 19 and Foam No. 20 (as identified above in Table 5) was determined by measuring cream time, string time and density of the foam prepared initially and after storage of the polyol blend for 1 day, 4 days, 1 week and 2, 3, 4 and 5 weeks, respectively, at 40° C.

The results are presented in Table 6 for Foam No. 19 and in Table 7 for Foam No. 20.

TABLE 6

| Foam No. 19 | Cream time (sec) | String time (sec) | Density (g/l) |
|---|---|---|---|
| Initial | 12 | 107 | 30.4 |
| After 1 day | 15 | 111 | 30.3 |
| After 4 days | 15 | 115 | 31.3 |
| After 1 week | 15 | 113 | 31.6 |
| After 2 weeks | 15 | 112 | 31.4 |
| After 3 weeks | 15 | 117 | 31.7 |
| After 4 weeks | 14 | 115 | 31.1 |
| After 5 weeks | 15 | 118 | 30.8 |

TABLE 7

| Foam No. 20 | Cream time (sec) | String time (sec) | Density (g/l) |
|---|---|---|---|
| Initial | 15 | 106 | 30.8 |
| After 1 week | 15 | 106 | 30.3 |
| After 2 weeks | 15 | 108 | 30.3 |
| After 4 weeks | 15 | 110 | 31.2 |
| After 5 weeks | 15 | 108 | 30.1 |

EXAMPLE 6

Rigid polyurethane foams were made from a polyol composition and a polyisocyanate composition containing the ingredients listed below in Table 8 at an NCO index of 1.

The reaction profile was followed in respect of cream time (time taken for the reaction mixture to start foaming) and string time (time taken for the reaction mixture to reach thee transition point from fluid to cross-linked mass). Free rise density was also determined.

The results are also given in Table 8.

TABLE 8

| Foam No. | | 23 | 24 | 25 |
|---|---|---|---|---|
| POLYOL | | | | |
| Polyol A | pbw | 21.4 | 21.4 | 21.4 |
| Polyol B | pbw | 34.0 | | |
| Polyol C | pbw | 11.7 | 11.7 | 11.7 |
| Polyol D | pbw | 11.0 | 11.0 | 11.0 |
| Polyol E | pbw | | 34.0 | |
| Polyol F | pbw | | | 34.0 |
| Lactic acid | pbw | 1.1 | 1.1 | 1.1 |
| Fire retardant B | pbw | 13.5 | 13.5 | 13.5 |
| Surfactant | pbw | 1.8 | 1.8 | 1.8 |
| DMBA | pbw | 1.2 | 1.1 | 1.0 |
| DMDEE | pbw | 0.9 | 0.8 | 0.9 |
| water | pbw | 3.4 | 3.4 | 3.4 |
| HFC 134a | pbw | 4.0 | 4.0 | 4.0 |
| POLYISOCYANATE | | | | |
| SUPRASEC DNR | pbw | 140 | 126 | 140 |
| Cream time | sec | 7 | 7 | 6 |
| String time | sec | 95 | 91 | 95 |
| Free rise density | kg/m³ | 27.6 | 27.3 | 28.0 |

What is claimed is:

1. Process for making rigid polyurethane of urethane-modified polyisocyanurate foams comprising reacting an organic polyisocyanate composition with an isocyanate-reactive composition, wherein said isocyanate reactive composition comprises a polyester polyol, an amine catalyst and a carboxylic acid, the carboxylic acid containing at least one OH, SH, $NH_2$ or $NHR$ functional group, wherein R is an alkyl, cycloalkyl or aryl group.

2. Process according to claim 1, wherein the carboxylic acid has the formula $$X_n\text{—}R'\text{—}(COOH)_m$$

wherein,

X is OH, SH, $NH_2$ OR NHR,

R' is an at least divalent hydrocarbon moiety, n is an integer having a value of at least 1, and m is an integer having a value of at least 1.

3. Process according to claim 2, wherein X is OH, R' is a linear or branched aliphatic hydrocarbon having 1 to 5 carbon atoms, n is 1 and m is 1, 2 or 3.

4. Process according to claim 1, wherein said carboxylic acid is lactic acid, glycolic acid, malic acid or citric acid.

5. Process according to claim 1, wherein said carboxylic acid comprises a mixture of citric acid and malic acid at a weight ratio about 1:1.

6. Process according to claim 1, wherein the isocyanate-reactive composition comprises from 0.1 to 5 wt. % of said carboxylic acid.

7. Process according to claim 1, wherein the polyester polyol has an average functionality of 1.8 to 8, a hydroxyl number of 15 to 750 mg KOH/g, and a molecular weight of 400 to 10000.

8. Process according to claim 7, wherein the isocyanate-reactive composition comprises at least 10% by weight of the polyester polyol, based on the weight of isocyanate-reactive compounds.

9. Process according to claim 1, wherein the isocyanate-reactive composition comprises at least 10% by weight of the polyester polyol, based on the weight of isocyanate-reactive compounds.

10. Process according to claim 1, wherein the amine catalyst is a tertiary amine selected from the group consisting of N-alkylmorpholine, N-alkylalkanolamine, N,N-dialkylcyclohexylamine, alkylamine, and heterocyclic amine.

11. Process according to claim 1, wherein the amine catalyst is dimorpholino diethylether, N-methylimidazole, dimethylamino pyridine or a triazine.

12. Process according to claim 11, wherein the isocyanate-reactive composition comprises 0.1 to 5% by weight of the amine amine catalyst.

13. Process according to claim 1, wherein the isocyanate-reactive composition comprises 0.1 to 5% by weight of the amine amine catalyst.

14. Process according to claim 1, which further comprises reacting the organic polyisocyanate composition with the isocyanate-reactive composition in the presence of a blowing agent.

15. Process for making rigid polyurethane or urethane-modified polyisocyanurate foams comprising reacting an organic polyisocyanate composition with a polyester polyol in the presence of an amine catalyst and a carboxylic acid, the carboxylic acid containing at least one OH, SH, $NH_2$ or NHR functional group, wherein R is an alkyl, cycloalkyl or aryl group.

16. Process according to claim 15, which comprises reacting the organic polyisocyanate composition with an isocyanate-reactive composition comprising:

(i) at least 10 wt %, relative to the total weight of isocyanate-reactive compounds, of a polyester polyol having an average functionality of from 1.8 to 8,
a hydroxyl number of from 15 to 750 mg KOH/g, and
a molecular weight of 400 to 10,000;

(ii) 0.1–5 wt %, relative to the total weight of the isocyanate-reactive composition, of an amine catalyst;

(iii) 0.1–5 wt %, relative to the total weight of the isocyanate-reactive composition, of at least one carboxylic acid represented by the formula HO—R'—$(COOH)_m$, wherein R' represents a linear or branched aliphatic hydrocarbon having 1 to 5 carbon atoms, and m represents the value 1, 2, or 3; and (iv) a blowing agent.

17. The process according to claim 15, which comprises reacting the organic polyisocyanate with an isocyanate-reactive composition comprising:

(i) a polyester polyol;

(ii) an amine catalyst; and (iii) 0.1–5 wt %, relative to the total weight of the isocyanate-reactive composition, of at least one carboxylic acid represented by the formula $X_n$—R'—$(COOH)_m$, wherein X represents OH, SH, $NH_2$, or NHR, R' represents an at least divalent hydrocarbon moiety, n and m individually represent an integer having a value of at least 1, and R represents an alkyl, cycloalkyl, or aryl group.

18. Rigid polyurethane or urethane-modified polyisocyanurate foam obtained by the process of claim 17.

19. Rigid polyurethane or urethane-modified polyisocyanurate foam obtained by the process of claim 16.

20. Rigid polyurethane or urethane-modified polyisocyanurate foam obtained by the process of claim 1.

* * * * *